United States Patent [19]
Burns et al.

[11] Patent Number: 5,674,622
[45] Date of Patent: Oct. 7, 1997

[54] FLUORESCENT DYE BLENDS

[75] Inventors: David M. Burns, Woodbury; Lee A. Pavelka, Cottage Grove, both of Minn.

[73] Assignee: Minnesota Mining and Manufacturing Company, St. Paul, Minn.

[21] Appl. No.: 536,572

[22] Filed: Sep. 29, 1995

[51] Int. Cl.$^6$ ............... B32B 27/36; G02B 3/00
[52] U.S. Cl. ............ 428/412; 428/542.2; 428/542.6; 428/913; 359/361; 359/350; 359/580; 359/581; 359/582; 359/589
[58] Field of Search ................... 428/412, 542.2, 428/542.6, 913; 359/361, 350, 580, 582, 581, 588

[56] References Cited

U.S. PATENT DOCUMENTS

| | | | |
|---|---|---|---|
| 4,039,467 | 8/1977 | Tucker | 252/587 |
| 4,443,226 | 4/1984 | Rohser | 8/532 |
| 5,200,851 | 4/1993 | Coderre et al. | 359/530 |
| 5,387,458 | 2/1995 | Pavelka et al. | 428/141 |

FOREIGN PATENT DOCUMENTS

| | | |
|---|---|---|
| 41274 | 9/1981 | European Pat. Off. . |
| WOA9617012 | 6/1996 | WIPO . |

OTHER PUBLICATIONS

"Fluorescent Dyes" by Robert M. Christie, Dept of Textiles, Scottish College of Textiles, Netherdale, Galashiels, TD13HF, UK, Rev. Prog. Coloration, pp. 1–18, vol. 23, 1993.

"Match Prediction of Highly Fluorescent Colors", by Frederick T. Simon, Robert A. Funk and Ann Campbell Laidlow, Color Research and Application, pp. 461–474, vol. 19, No. 6, Dec. 1994.

"Energy Tranfer between Fluorescent Organic Pigments", by Fred W. Billmeyer, Jr. and Lisa B. Hepfinger, Dept. of Chemistry, Rensselaer Polytechnic Institute, Troy, New York, Color Research and Application, pp. 12–16, vol. 8, No. 1, Spring 1983.

*Primary Examiner*—Leszek Kilman
*Attorney, Agent, or Firm*—Gary L. Griswold; Walter N. Kirn; Robert H. Jordan

[57] ABSTRACT

A fluorescent yellow article comprising polycarbonate polymer, perylene imide dye Chromophthal Red 6961A and at least one yellow-green dye selected from the group consisting essentially of Lumogen F Yellow 083, CI Solvent Yellow 98, CI Solvent Yellow 160:1, Oraset Yellow 8GF, CI Solvent Green 4, CI Solvent Green 5, CI Pigment Yellow 101, Golden Yellow D304 and CI Solvent Yellow 131 wherein the resultant article has chromaticity coordinates (x,y) within the area defined by (0.425,0.480), (0.465, 0.535), (0.557,0.440), and (0.500,0.410) in terms of the CIE 1931 Standard Colorimetric System and measured using 0/45 geometry and evaluated with CIE Standard Illuminant D65.

3 Claims, 2 Drawing Sheets

FLUORESCENT DYE BLENDS

FIELD OF THE INVENTION

The invention relates to fluorescent coloring. Specifically the invention relates to providing fluorescent yellow articles.

BACKGROUND OF THE INVENTION

It is commonly known that fluorescent colors provide increased visibility for visual signaling under most lighting conditions, but particularly under low natural lighting conditions. These low natural lighting conditions occur at dusk and also at sunrise and present a challenge for traffic sign manufacturers. If increased visibility of an article is desired, the article is often colored with fluorescent colorants. Fluorescent colors allow enhanced visibility because the visual contrast that the fluorescent colors create with the environment make the materials more conspicuous than ordinary nonfluorescent articles. Fluorescent colored traffic signs are effective at increasing the visibility of the signs which increases motorist safety.

Even though fluorescent signs increase motorist safety, their use for yellow signs has been limited due to the difficulty to obtain a true fluorescent yellow. To date, fluorescent colorants are available in only a limited range of hues. For example, fluorescent colorants are commercially available and include fluorescent red, fluorescent orange and fluorescent yellow-green. However, a true fluorescent yellow which meets the chromaticity requirements of Commission Internationale de l'eclairage (CIE) and ASTM is not readily available. As is known in the art the CIE provides international recommendations for surface colors for visual signaling.

Formulating colors using ordinary or conventional colorants is well known. Ordinary colors do not emit light. Therefore, when formulating colors with ordinary colorants, the important parameters to consider are the light absorptive and light reflective properties of the colorants. On the other hand, fluorescent colors do emit light. Therefore, when formulating with fluorescent colorants the important parameters to consider are the light absorptive, light reflective and light emissive properties of the fluorescent colorants. Due to this distinction between ordinary and fluorescent colors, an added consideration is necessary when formulating colors with fluorescent dyes.

The art of formulating colors from ordinary colorants is well-developed. For example, it is known that a mixture of a blue colorant with a red colorant will give a purple color. However, the art of formulating colors from fluorescent colorants is not well-defined. U.S. Pat. No. 4,443,226 issued to Rohser describes combining thioindigo and/or derivatives of the red and pink series of thioindigo with specific yellow disperse dyestuffs to obtain a shade of fluorescent orange-red as required to meet color point, luminance and fastness to light.

The need exists for yellow fluorescent articles such as those useful for visual signaling, for example, traffic signing. The art does not currently possess such yellow fluorescent articles nor an obvious way to achieve them.

SUMMARY OF THE INVENTION

The invention provides fluorescent articles which have a yellow color with chromaticity coordinates within the CIE and ASTM requirements. Each article is comprised of a polycarbonate and a blend of at least two different dyes. Also provided are fluorescent yellow retroreflective sheeting and methods of manufacturing such sheeting.

A fluorescent yellow article is provided which comprises 1) polycarbonate, (2) perylene [perlyene] imide dye Chromophthal Red 6961A, and 3) at least one yellow-green dye selected from the group of Lumogen F Yellow 083, CI Solvent Yellow 98, CI Solvent Yellow 160:1, Oraset Yellow 8GF, CI Solvent Green 4, CI Solvent Green 5, CI Pigment Yellow 101, Golden Yellow D-304 and CI Solvent Yellow 131. The resulting article has chromaticity coordinates (x,y) within the area defined by (0.425,0.480), (0.465,0.535), (0.557,0.440), and (0.500,0.410) in terms of the CIE 1931 Standard Colorimetric System and measured using 0/45 geometry and evaluated with CIE Standard Illuminant D65.

A method of manufacturing a fluorescent yellow article comprising the steps of:

a) combining 1) polycarbonate, 2) a perylene imide dye Chromophthal Red 6961A, and 3) at least one yellow-green dye selected from the group consisting esssetially of Lumogen F Yellow 083, CI Solvent Yellow 98, CI Solvent Yellow 160:1, Oraset Yellow 8GF, CI Solvent Green 4, CI Solvent Green 5, CI Pigment Yellow 101, Golden Yellow D-304, and CI Solvent Yellow 131; and b) extruding said combination to provide a film having chromaticity coordinates (x,y) within the area defined by (0.425,0.480), (0.465,0.535), (0.557,0.440), and (0.500,0.410) in terms of the CIE 1931 Standard Colorimetric System and measured using 0/45 geometry and evaluated with CIE Standard Illuminant D65.

BRIEF DESCRIPTION OF THE DRAWINGS

The invention is further explained with reference to the drawings, wherein.

DETAILED DESCRIPTION OF ILLUSTRATIVE EMBODIMENTS

Definitions

As referred to herein, the term "colorant" shall mean pigment or dyes or other substances used to impart hue and chroma and value to an article.

As referred to herein, the term "conventional colorant" or "ordinary colorant" are used interchangeably herein and shall mean colorants which do not exhibit fluorescent properties.

As referred to herein, the term "dye" shall mean substances which impart color to a substrate by selective absorption of light. Dyes are soluble and/or go through an application process which, at least temporarily, destroys any crystal structure of the color substances. Dyes are retained in the substrate by absorption, solution, and mechanical retention, or by ionic or covalent chemical bonds.

As referred to herein the term "fluorescent dye" shall mean a dye which absorbs light at a first wavelength and emits at second wavelength which is longer than the first wavelength.

Figure 4:
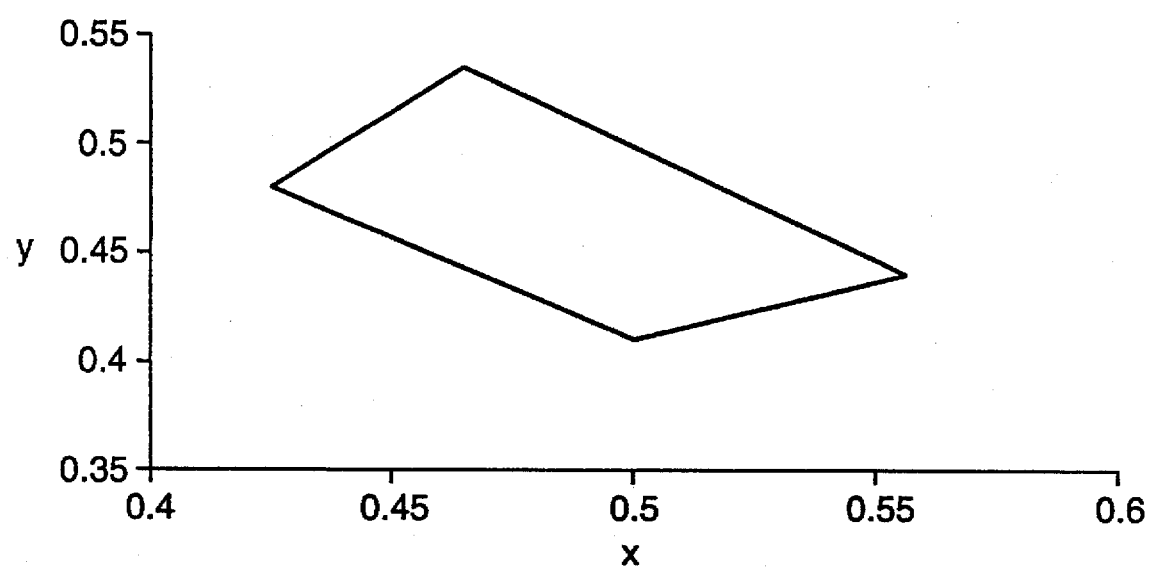
FIG. 4 is a CIE 1931 Chromaticity diagram defining the area of color space defined herein as yellow.

As referred to herein the term "yellow" shall mean the color which is within the area defined by the four CIE chromaticity coordinates plotted and shown in FIG. 4:

| x | y |
|---|---|
| .500 | .410 |
| .425 | .480 |
| .465 | .535 |
| .557 | .440 |

Preferably the area is defined by chromacity coordinates (x, y): (0.425, 0.48), (0.465, 0.535), (0.557, 0.44) and (0.5, 0.41); more preferably (0.425, 0.48), (0.465, 0.535), (0.532, 0.465) and (0.48, 0.43); and most preferably (0.44, 0.5), (0.465, 0.535), (0.532, 0.465) and (0.5, 0.443). The most preferred range defines high saturations of color.

The invention is obtained by combining a yellow-green fluorescent dye with a perylene imide dye in a polymeric matrix in which the blend of dyes is soluble. The perylene imide dye used in the invention are orangish in appearance. The combination of dyes has been found to be polymer-specific.

Polycarbonate

Polycarbonate is a matrix which is useful in the invention. Perylene imide dye Chromophthal Red 6961A purchased from Ciba Geigy of Basel, Switzerland is useful in polycarbonate matrices. This imide dye may be combined with at least one yellow-green dye selected from the group of Lumogen F Yellow 083 available from BASF of Ludwigshafen, Germany, CI Solvent Yellow 98, CI Solvent Yellow 160:1, Oraset Yellow 8GF available from Ciba-Geigy of Basel, Switzerland, CI Solvent Green 4, CI Solvent Green 5, CI Pigment Yellow 101, Golden Yellow D304 available from Day-Glo of Cleveland, Ohio, and CI Solvent Yellow 131.

Polycarbonate/Polyester Blends

Polyester/polycarbonate alloys such as DA003 available from Eastman Chemical Company, Kingsport, Tenn. is a matrix which is useful in the invention. Perylene imide dye Chromophthal Red 6961A is useful in polycarbonate/polyester matrices. Any of the mentioned perylene imide dyes may be combined with at least one yellow-green dye selected from the group of Lumogen F Yellow 083 available from BASF of Ludwigshafen, Germany, CI Solvent Yellow 98, CI Solvent Yellow 160:1, Oraset Yellow 8GF available from Ciba-Geigy of Basel, Switzerland, CI Solvent Green 4, CI Solvent Green 5, CI Pigment Yellow 101, Golden Yellow D304 available from Day-Glo of Cleveland, Ohio, and CI Solvent Yellow 131.

Dye Ratios and Loadings

The ratio of the yellow-green dye to perylene imide dye may vary over a wide range. In suitable proportions dye blends of the invention will provide a yellow fluorescent color within the chromaticity coordinates for yellow as defined above which encompass both the ASTM and CIE limits for visual signaling yellow. The range of yellow-green dye to perylene imide dye to obtain a fluorescent yellow is in the range from about 100 parts perylene imide dye to 1 part yellow-green dye by weight to about 10 parts perylene imide dye to 100 parts yellow-green dye. One skilled in the art will recognize that the actual ratio chosen will depend upon variables depending upon the intended final use of the invention. This includes the molecular weight and the absorption characteristics (such as molar absorptivity) of the specific dyes employed, and also includes product construction variables such as film thickness if film is constructed. If the invention is used in retroreflective sheeting constructions the ratio of the yellow-green to perylene imide dye may also depend upon the use of backing layers used to achieve the retroreflection such as microspheres, cubes and the like which are described in more detail below.

Typically, between about 0.01 and about 2.00 weight percent, and preferably between about 0.05 and about 0.70 weight percent and most preferably between about 0.1 and about 0.5 weight percent of the fluorescent dye blend is contained in the article of the present invention. It will be understood that articles with dye loadings outside this range can be used in accordance with the invention. Although dye loading may vary depending upon the final application, these loadings are typical for about a 0.075 to 0.25 mm thick film. However, if the dye is added to a thicker film, lower dye loadings can give the same visual effect. As known by those in the art, articles having heavier dye loadings will exhibit brighter fluorescence and/or deeper color than will articles with lighter dye loadings of the same dye. However, articles having very high fluorescent dye loadings may exhibit a self-quenching phenomenon which occurs when molecules of the fluorescent dye absorbs the energy emitted by neighboring fluorescent dye molecules. This self-quenching causes an undesirable decrease in fluorescent brightness.

Figure 1:
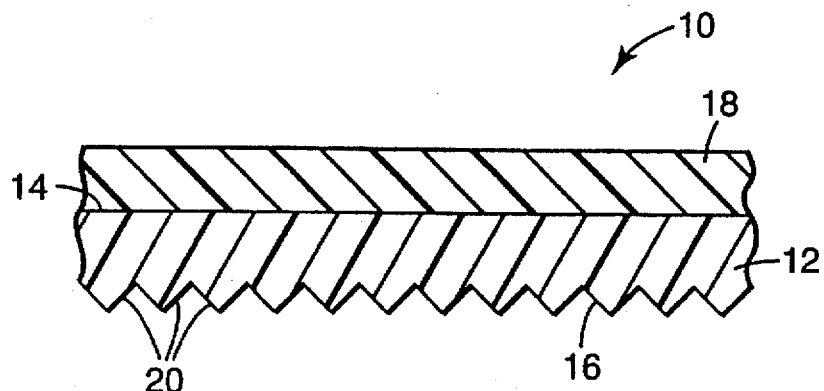
FIG. 1 is a cross-sectional illustration of a portion of one retroreflective embodiment of the invention.
Figure 2:
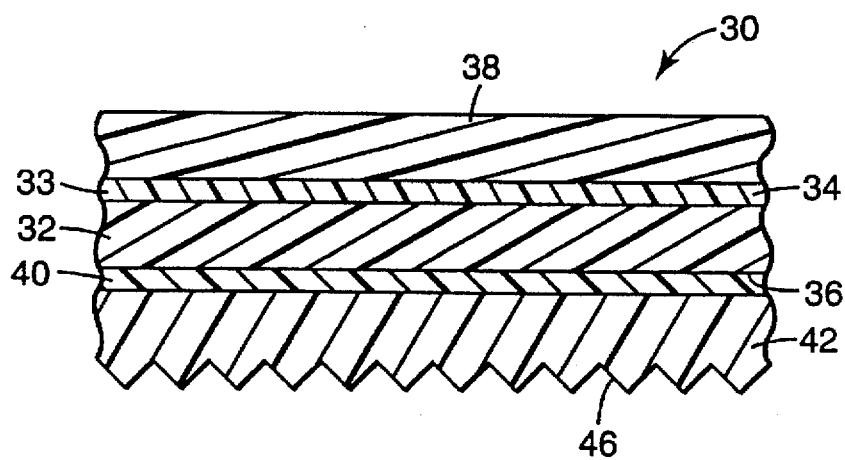
FIG. 2 is a cross-sectional illustration of a portion of another retroreflective embodiment of the invention.

In some embodiments the articles of the invention are films. In yet other embodiments, these films of the invention are retroreflective. Films of the invention without opacifying agents such as titanium oxide or calcium carbonate are transparent. Such capability may be achieved as shown in FIG. 1 by forming retroreflective elements 20 on second side 16 of color layer 12, or alternatively as shown in FIG. 2 by attaching retroreflective base sheet 42 to second 36 of color layer 32, either with transparent intermediate adhesive layer 40 as shown or by laminating the base sheet and color layer in direct contact with one another (not shown). As shown in FIG. 2, retroreflective base sheet 42 comprises a member with cube-corner retroreflective elements formed on back side 46 thereof. In other embodiments, the retroreflective base sheet may comprise a microsphere-based retroreflective structure, e.g., comprising a monolayer of transparent microspheres and reflective means disposed on the opposite side of the monolayer as the color layer. For instance, a screen layer/color layer combination of the invention may be laminated to the front surface of the cover film of an encapsulated-lens retroreflective sheeting such as is disclosed in U.S. Pat. No. 3,190,178 (McKenzie) or it may even be used as the cover film of an encapsulated-lens sheeting. A screen layer is an overlay of clear polymer and may or may not include a UV-absorber and is optional in the present invention. In retroreflective embodiments, the color layer or at least that portion of it which is disposed in from the retroreflective elements, i.e., between the retroreflective elements and the screen layer, should be substantially transparent to visible light.

Figure 3:
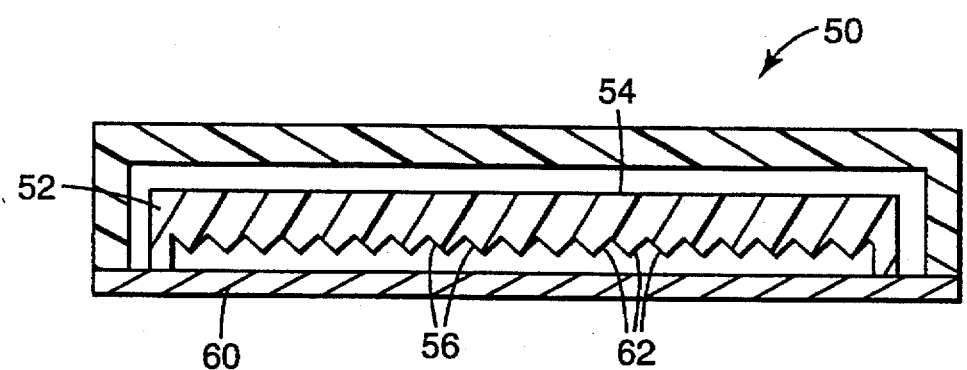
FIG. 3 is a cross-sectional illustration of another retroreflective embodiment of the invention.

FIG. 3 illustrates another retroreflective embodiment of the invention wherein the article of the invention is a "button-type" retroreflector. Article 50 comprises color layer 52 with first side 54 and second side 56, screen layer 58 disposed to first side 54, and base member 60, with screen layer 58 and base member 60 enclosing color layer 52. Second side 56 has retroreflective elements 62 formed therein. Screen layer 58 and color layer 52 can be disposed spaced apart from one another as shown, or alternatively may be placed in contact with one another. Article 50 can be mounted on a backing (not shown), e.g., a sign panel, such that first side 54 is presented for viewing and retroreflective effect, with screen layer 58.

If desired, articles of the invention may be made in substantially rigid or flexible form. For example, in some embodiments the article may be sufficiently flexible to be wound about a mandrel having a diameter of about 1 centimeter.

EXAMPLES

The invention is further explained by the following examples which are intended as nonlimiting. Unless otherwise indicated, all amounts are expressed in parts by weight.

The following abbreviations are used in the examples:

| Abbreviation | Meaning |
|---|---|
| L083 | Lumogen F Yellow 083 - perylene dye from BASF |
| SY98 | CI Solvent Yellow 98 - thioxanthene dye from Hoechst |
| SY160 | CI Solvent Yellow 160:1 - benzoxazolecoumarin dye from Bayer |
| O8GF | Oraset Yellow 8GF - methine dye from Ciba-Geigy |
| SG4 | CI Solvent Green 4 - xanthene dye from BASF |
| SG5 | CI Solvent Green 5 - perylene dye from BASF |
| PY101 | CI Pigment Yellow 101 - azomethine dye from BASF |
| D304 | Golden Yellow D-304 - thioxanthene dye from Day-Glo Color |
| SY131 | CI Solvent Yellow 131 - naphthalimide dye from Day-Glo Color |
| 6961A | Chromophthal Red 6961A from Ciba Geigy |
| PC | Bisphenol A polycarbonate |

Color Measurement

Chromaticity coordinates for samples were determined using a Labscan 6000 Spectrophotometer from Hunter Associates Laboratory, Inc. of Reston, Va. at the following settings and conditions:

Illuminant $D_{65}$,
0/45 Geometry, and
CIE 2 Degree Standard Observer.

Fluorescence

Samples were viewed under daylight illumination to test if the sample films appeared fluorescent to the naked eye. The samples were considered fluorescent if they glowed along a cut edge.

EXAMPLE 1

Example 1 demonstrates embodiments of the invention in a polycarbonate matrix with a range of dye loadings.

Films were prepared for Example 1 as follows. The fluorescent dyes were blended with polycarbonate resin pellets at the weight percent loadings indicated in Table 1. The resin pellets used were Makrolon FCR-2407 available from Bayer Corporation of Pittsburgh, Pa. The dye/resin mixture was dried overnight to remove moisture. After drying overnight, the mixture was extruded into film of about 4 mils (0.1 mm) thick using a single screw extruder with three heating zones set at 260° C., 260° C. and 304° C. and a film die set at 304° C. The extruder was a ¾ inch single screw extruder for the Haake Rheocord as available from Haake of Karlsruhe, Germany.

Samples were prepared by hot laminating two 4 mil (0.10 mm) colored films together and by laminating a 2 mil (0.05 mm) clear PMMA overlay to a first surface of the resulting colored film. Retroreflective elements were embossed into the second surface of the colored film. The 2 mil (0.05 mm) overlay contained 1.8 wt. % Tinuvin 327 from Ciba Geigy Corp.

Color was determined for each sample as described above and results are shown in Table 1. Fluorescence testing was also undertaken for each sample and was observed in each sample.

TABLE 1

| Sample Number | Dye 1 | Dye 1 Weight % | Dye 2 | Dye 2 Weight % | Chromaticity Coordinates x | Chromaticity Coordinates y |
|---|---|---|---|---|---|---|
| 1A | 6961A | 0.05 | SY98 | 0.15 | 0.485 | 0.503 |
| 1B | 6961A | 0.10 | SY98 | 0.10 | 0.501 | 0.488 |
| IC | 6961A | 0.12 | SY98 | 0.12 | 0.510 | 0.482 |

We claim:

1. A fluorescent article comprising 1) polycarbonate, 2) perylene imide dye Chromophthal Red 6961A, and 3) and at least one yellow-green dye selected from the group consisting essentially of Lumogen F Yellow 083, CI Solvent Yellow 98, CI Solvent Yellow 160:1, Oraset Yellow 8GF, CI Solvent Green 4, CI Solvent Green 5, CI Pigment Yellow 101, Golden Yellow D-304 and CI Solvent Yellow 131 wherein said article has chromaticity coordinates (x,y) within the area defined by (0.425,0.480), (0.465,0.535), (0.557,0.440), and (0.500,0.410) in terms of the CIE 1931 Standard Colorimetric System and measured using 0/45 geometry and evaluated with CIE Standard Illuminant D65.

2. A fluorescent retroreflective article comprising a color layer having first and second sides, wherein said article comprises retroreflective elements on one side of said color layer or a retroreflective base sheet disposed on one side of said color layer, wherein said color layer is comprised of 1) polycarbonate, 2) perylene imide dye Chromophthal Red 6961A, and 3) at least one yellow-green dye selected from the group consisting essentially of Lumogen F Yellow 083, CI Solvent Yellow 98, CI Solvent Yellow 160:1, Oraset Yellow 8GF, CI Solvent Green 4, CI Solvent Green 5, CI Pigment Yellow 101, Golden Yellow D-304, and CI Solvent Yellow 131 dissolved in polycarbonate wherein the color layer has chromaticity coordinates (x,y) within the area defined by (0.425,0.480), (0.465,0.535), (0.557,0.440), and (0.500,0.410) in terms of the CIE 1931 Standard Colorimetric System and measured using 0/45 geometry and evaluated with CIE Standard Illuminant D65.

3. A method of manufacturing a fluorescent article comprising the steps of:

a) combining 1) polycarbonate, 2) perylene imide dye Chromophthal Red 6961A, and 3) at least one yellow-green dye selected from the group consisting essentially of Lumogen F Yellow 083, CI Solvent Yellow 98, CI Solvent Yellow 160:1, Oraset Yellow 8GF, CI Solvent Green 4, CI Solvent Green 5, CI Pigment Yellow 101, Golden Yellow D-304, and CI Solvent Yellow 131; and b) extruding said combination to provide a film having chromaticity coordinates (x,y) within the area defined by (0.425,0.480), (0.465,0.535), (0.557,0.440), and (0.500,0.410) in terms of the CIE 1931 Standard Colorimetric System and measured using 0/45 geometry and evaluated with CIE Standard Illuminant D65.

* * * * *